April 9, 1963 W. E. LATTNER 3,084,724
TILTABLE WORK SUPPORT MACHINE FOR SAWING OR GRINDING
Filed March 23, 1961

INVENTOR.
WILLIAM E. LATTNER
BY John R. Walker, III
Attorney

United States Patent Office 3,084,724
Patented Apr. 9, 1963

3,084,724
TILTABLE WORK SUPPORT MACHINE FOR SAWING OR GRINDING
William E. Lattner, Doniphan, Ark.
(P.O. Box 56, Clarksville, Ark.)
Filed Mar. 23, 1961, Ser. No. 97,931
8 Claims. (Cl. 143—58)

This invention relates to an improved machine for sawing or grinding work pieces.

Although in the description to follow and in the drawing the tool itself is disclosed as a saw, it will be understood that the tool could be replaced by a grinding wheel without departing from the spirit and scope of the present invention.

In the lumber industry the common manner of cutting strips of lumber is either by a machine wherein the lumber is held stationary with the saw being swung across the work or by a machine in which the lumber is pushed into a saw. The present invention eliminates the time and motion expended in the above mentioned types of machines by providing a unique means of cutting off the material wherein the material is held on a pivotable work table, which is urged into an upper position by resilient means and so arranged that the operator pushes downward on the table to carry the material therewith into engagement with a circular saw that enters a slot in the table. In other words, in pushing the table downward the table is brought down over the saw with the saw extending upwardly through the slot therein to engage the work piece, and when the table is released it is automatically returned to a position wherein the top surface thereof is above the upper edge of the saw so that the work piece is freely slidable on the table without interference from the saw.

Thus, one of the objects of the present invention is to provide an improved machine for sawing or grinding work pieces.

A further object is to provide such a machine that is economical to manufacture.

A further object is to provide such a machine that facilitates the trimming or cutting off of pieces of wood so that time and motion heretofore expended in the usual machines for doing this type of work is greatly reduced.

A further object is to provide in such a machine an improved mechanism for urging the work table upwardly.

A further object is to provide such a machine that is convenient and safe to use.

A further object is to provide such a machine wherein accuracy of workmanship can be obtained.

A further object is to provide improved means for carrying the waste away from the work area.

A further object is to generally improve the design and construction of machines for sawing or grinding.

The means by which the foregoing and other objects of the present invention are accomplished and the manner of their accomplishment will be readily understood from the following specification upon reference to the accompanying drawings, in which.

Figure 1:
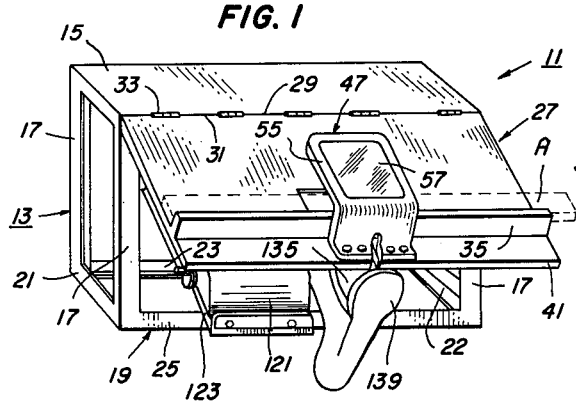
FIG. 1 is a perspective view of the machine of the present invention, illustrating in dotted lines a strip of wood in position thereon and ready to be cut by pushing down on the work table.

Referring now to the drawings in which the various parts are indicated by numerals, machine 11 of the present invention includes an open frame 13, which comprises a substantially horizontal top 15 supported adjacent the four corners thereof by vertical members 17 from an open rectangular bottom 19 including sides 21, 22 interconnected by back member 23 and front member 25.

Figure 2:
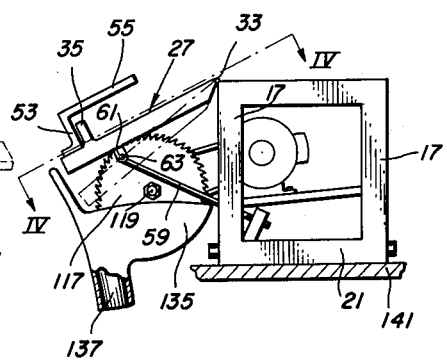
FIG. 2 is a side elevational view of the machine with a portion being broken away for purposes of illustration, and showing in broken lines the lower position of the work table.
Figure 3:
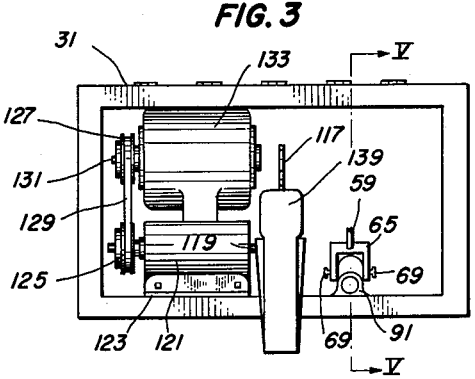
FIG. 3 is a front elevational view of the machine with the work table being removed for purposes of illustration.
Figure 4:
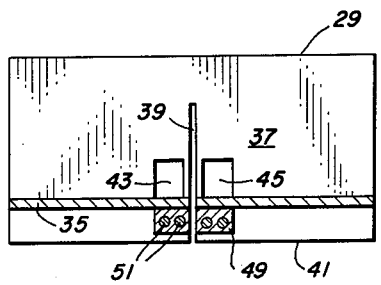
FIG. 4 is a sectional view of the work table taken as on the line IV—IV of FIG. 2.

A substantially rectangular work table 27 is pivotally supported adjacent the rearward upper edge 29 thereof from the forward edge 31 of top 15, as by means of hinges 33 or the like, so that work table 27 is swingable about a substantially horizontal axis between an upper position, shown in solid lines in FIG. 2, and a lower position, shown in dotted lines in this figure. In both of these positions table 27 preferably angles downwardly and forwardly from the edge 31 of frame 13. A cleat bar 35 is fixedly mounted across work table 27 and extends perpendicularly upwardly from the top surface 37 of the work table. A vertical slot 39 extends through table 27 and is substantially perpendicular to the horizontal pivot axis of the table about hinges 33. Slot 39 extends from the lower edge 41 of table 27 towards the upper edge 29 for a major portion of the distance from the lower edge to the upper edge. A pair of openings 43, 45 are provided through table 27 on opposite sides of slot 39 for a purpose later to be described.

A combination visor and handguard 47 is supported from table 27. Visor and handguard 47 includes a portion 49 forward of cleat 35 in flat face-to-face engagement with upper surface 37 and attached thereto as by means of bolts 51 or the like. In addition, visor and handguard 47 includes an upstanding portion 53 integrally formed with portion 49 and extending perpendicularly upward from table 27 and thence extending rearwardly for a portion as at 55 in parallel relation to table 27 in which a safety glass 57 is provided in an opening in this portion 55. Visor and handguard 47 is disposed adjacent the forward mid-portion of the table 27 so that safety glass 57 extends over slot 39.

Figure 7:
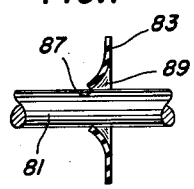
FIG. 7 is a fragmentary enlarged view of another portion of the assembly shown in FIG. 5.

A link 59 is pivotally connected adjacent the upper end thereof to table 27 at a place on the bottom thereof spaced from hinges 33, as by means of a projection 61 depending from the table and pivotally connected to the link by a pin 63 or the like. Link 59 adjacent the lower end thereof is provided with a yoke 65 which in turn is pivotally connected to an assembly 67 as by means of a pair of pins 69 fixedly attached to a hollow cylindrical housing 71 of the assembly and extending outwardly in opposite directions therefrom respectively through apertures in yoke 65. Pins 69 are located midway between the opposite ends of the housing and on a transverse horizontal axis thereof which is perpendicular to and passes through the longitudinal axis of housing 71 so that the transmission of pressure from the link 59 and yoke 65 to the housing is balanced. By the same token, the transmission of pressure in the opposite direction from housing 71 to link 59 and yoke 65 is balanced, as will be better understood in the description of the operation of the device to follow later. Caps 73, 75 are removably and fixedly attached to the opposite ends of housing 71 by suitable means to close off the ends of the housing. Caps 73, 75 are respectively provided with central apertures 77, 79 through which extends a substantially horizontal rod 81. In the interior of housing 71 is provided a non-friction ball bushing 82 of usual construction with the ball bushing engaging rod 81 so that assembly 67 is freely movable on the rod. A pair of wipers 83, 85 are provided in housing 71 respectively between the opposite ends of the ball bushing 82 and caps 73, 75 to wipe rod 81 free of sawdust, waste material, etc. as the assembly is moved back and forth on the rod. The preferable construction of wiper 83 is best shown in FIG. 7 wherein it will be seen the wiper 83 is substantially disc-shaped with a cupped portion 89 adjacent the mid-portion thereof and having a central aperture 87 through which rod 81 extends. Wiper 83 is placed on rod 81 in such a manner that the cupped portion 89 extends away from ball bushing 82. Wiper 85 is substantially identical with wiper 83 but is placed on rod 81 so that the mid-portion thereof extends in the opposite direction from the mid-portion of wiper 83. Wipers 83, 85 are preferably formed from a resilient material, as rubber, neoprene or the like.

Rod 81 extends in a horizontal and generally fore and aft direction relative to frame 13, and is preferably supported adjacent the opposite ends thereof from upstanding pieces 91, 93 which are respectively integrally formed with members 25, 23. Pieces 91, 93 are provided with bores 95, 97, respectively, through which the ends of rod 81 extend and are held in place by means of rings 99, 101 respectively provided with set screws 103, 105 which engage rod 81. The rings 99, 101 are respectively removably fixed to the rod on the outer faces of upstanding pieces 91, 93.

Figure 5:
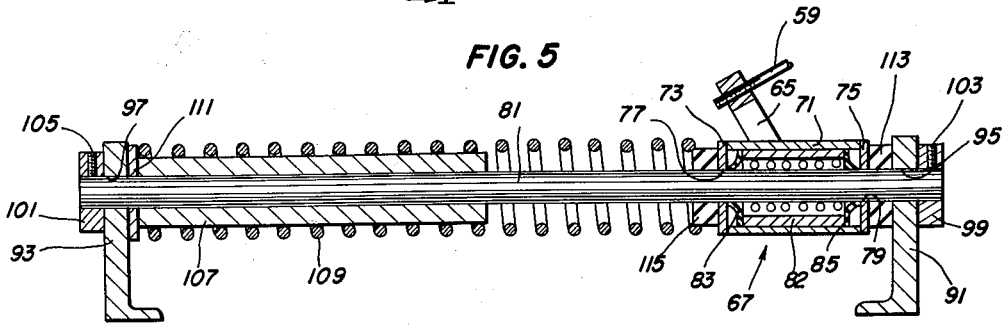
FIG. 5 is an enlarged sectional view taken as on the line V—V of FIG. 3.
Figure 6:
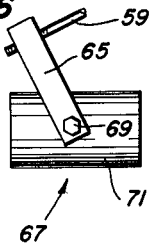
FIG. 6 is a fragmentary side elevational view of a portion of the assembly shown in FIG. 5.

An elongated cylindrical spring guide 107 is provided on rod 81 with the rod extending through the bore of the guide and with the spring guide being located adjacent the rearward end of the rod. A compression spring 109 is seated adjacent one end against a washer-like spring seat 111 provided on rod 81 between spring guide 107 and upstanding piece 93. The spring 109 extends from spring seat 111 over spring guide 107 and into contact with assembly 67 which acts as a seat for the other end of the spring. Spring guide 107, as can best be seen in FIG. 5, is greater in diameter than spring 109 so that the spring is held away from the rod 81, which is preferably of a hardened steel, thereby preventing the spring from scoring the rod. A cylindrical resilient bumper 113, formed of rubber or the like, is fixedly attached to upstanding piece 91 to limit forward movement of assembly 67 to stop the assembly in the forward position shown in FIG. 5. A similar bumper 115 is fixedly attached adjacent the rearward end of assembly 67 to engage the forward end of spring guide 107 and limit rearward movement of the assembly to stop the assembly in a rearward position.

It will be understood that with the above mentioned construction of assembly 67, a smooth operation of the parts is provided, and there is no binding of assembly 67 on rod 81, particularly with the relationship of yoke 65 and assembly 67.

When table 27 is depressed to said lower position heretofore described, assembly 67 is moved into said rearward position and when work table 27 is released, spring 109 urges assembly 67 into said forward position which in turn urges the work table to said upper position.

A substantially circular tool 117 is fixedly mounted on a substantially horizontal axle 119 by suitable means and the axle is in turn rotatably mounted in an elongated bearing 121 of well-known construction so that tool 117 is rotatably supported in a substantially vertical fixed position in alignment with slot 39. It will be understood that although tool 117 is illustrated as a saw it could be a circular grinding stone without departing from the spirit and scope of the present invention. Bearing 121 is fixedly mounted from a plate 123 which is in turn fixedly mounted from frame 13 by suitable means. A pulley 125 is fixedly attached to axle 119 adjacent the opposite end from tool 117 and is connected to another pulley 127 by means of a belt 129. Pulley 127 is fixedly attached to the shaft 131 of a motor 133 which in turn is supported by suitable means from plate 123. Thus, it will be seen that motor 133 rotationally drives tool 117.

A hopper 135, supported from plate 123 by suitable means, surrounds the lower part of tool 117 to catch the waste material falling down through openings 43, 45. A pipe 137 leads from hopper 135 so that the waste material is discharged downwardly. A protector plate 139 is fixedly and integrally attached to hopper 135 adjacent the forward end thereof and upstands therefrom in spaced adjacency to the lower edge 41 of table 27 to protect the operator from tool 117.

Machine 11 is preferably placed on a supporting surface as a bench 141 so that the table 27 is at such a height that the operator can look downwardly through safety glass 57 and can rest his hands upon table 27. To operate machine 11, a work piece, as illustrated in dotted lines at A in FIG. 1, is placed on top surface 37 of work table 27 against cleat bar 35 in the manner as shown in FIG. 1, and the work piece is moved longitudinally until the desired place to be cut is above tool 117; then the operator pushes the table 27 downwardly along with the work piece A, which is held firmly thereagainst, so that the work piece comes into engagement with tool 117 for the cutting thereof. After the work piece A is cut, then the operator releases table 27 and the table goes back into said upper position under the influence of spring 109 so that the work piece can either be removed or be moved lengthwise to another place to be cut.

It will be understood that the above mentioned operation is possible since when table 27 is in said upper position the top surface 37 of table 27 is above the upper edge of tool 117 and when the work table is depressed to said lower position the tool 117 extends above top surface 37 into engagement with the work piece A. Also, it will be understood that visor and handguard 47 is cut out to form an extension of slot 39 so that it will not interfere with tool 117 during the downward movement of work table 27 into said lower position. Also, the lower edge of cleat bar 35 adjacent slot 39 is preferably cut out to allow this movement.

From the foregoing description it will be seen that a very unique and efficient machine is provided for sawing or grinding work pieces. In addition, it will be seen that such a machine is provided that facilitates the trimming or cutting of pieces of wood so that time and motion heretofore expended in the usual machines for doing this type of work is greatly reduced. Also, it will be understood that a very convenient and safe machine is provided.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A machine for working on strips of material comprising a frame, a work table having an upper edge and a lower edge, said table including a substantially flat top surface, means adjacent said upper edge of said table yieldably and pivotally supporting said table from said frame for swinging movement of said table about a substantially horizontal axis between an upper position and a lower position, a substantially circular tool, means rotatably supporting said tool in a substantially vertical fixed position from said frame for rotation about a substantially horizontal axis, means coupled to said tool for the rotational drive thereof, said table being provided with a slot therethrough extending substantially perpendicular to the substantially horizontal axis of pivot of said table, a straight cleat bar fixedly attached to said table on said top surface thereof adjacent said lower edge thereof so that a strip of material can be held in position thereagainst and on the remote side thereof from said lower edge while extending over said slot, said tool being in vertical alignment with said slot and being positioned below and intermediate the ends of said cleat bar when said table is in said upper position, resilient means coupled to said table urging said table towards said upper position whereby said table is swingable downwardly by pressure thereon against the force of said resilient means to carry said table to said lower position, when in said lower position a portion of said tool extending above said top surface to engage a strip of material held in a position against said cleat bar for the working thereon, and when the downward pressure on said table is released said table automatically returning to said upper position under the force of said resilient means, when in said upper position said tool being lower than said top surface whereby a strip of material is slidable on said top surface into a desired position without engaging said tool.

2. A machine for working on strips of material comprising a frame, a work table having an upper edge and a lower edge, said table including a substantially flat top surface, means adjacent said upper edge of said table yieldably and pivotally supporting said table from said frame for swinging movement of said table about a substantially horizontal axis between an upper position and a lower position, a substantially circular tool, means rotatably supporting said tool from said frame, means coupled to said tool for the rotational drive thereof, said table being provided with a slot therethrough, said tool being in alignment with said slot, resilient means coupled to said table urging said table towards said upper position whereby said table is swingable downwardly by pressure thereon against the force of said resilient means to carry said table to said lower position, when in said lower position a portion of said tool extending above said top surface to engage a strip of material held in a position on said top surface for the working thereon, straight cleat bar means attached to said table adjacent said lower edge for engagement by the strip of material with downward pressure being exerted thereon to keep the strip of material in a fixed position while being worked upon by said tool, said tool being positioned below and intermediate the ends of said cleat bar means when said table is in said upper position and said tool being adjacent said cleat bar means when said table is in said lower position, and when the downward pressure on said table is released said table automatically returning to said upper position under the force of said resilient means, when in said upper position said tool being lower than said top surface whereby a strip of material is slidable on said top surface into a desired position without engaging said tool.

3. A machine for working on strips of material comprising a frame, a work table having an upper edge and a lower edge, said table including a substantially flat top surface, means adjacent said upper edge of said table yieldably and pivotally supporting said table from said frame for swinging movement of said table about a substantially horizontal axis between an upper position and a lower position, a substantially circular tool, means rotatably supporting said tool from said frame, means coupled to said tool for the rotational drive thereof, said table being provided with a slot therethrough, said table being provided with at least one opening therethrough adjacent said slot, said tool being in alignment with said slot, resilient means coupled to said table urging said table towards said upper position whereby said table is swingable downwardly by pressure thereon against the force of said resilient means to carry said table to said lower position, when in said lower position a portion of said tool extending above said top surface to engage a strip of material held in a position on said top surface for the working thereon, straight cleat bar means attached to said table adjacent said lower edge for engagement by the strip of material with downward pressure being exerted thereon to keep the strip of material in a fixed position while being worked upon by said tool, said tool being positioned below and intermediate the ends of said cleat bar means when said table is in said upper position and said tool being adjacent said cleat bar means when said table is in said lower position and when the downward pressure on said table is released said table automatically returning to said upper position under the force of said resilient means, when in said upper position said tool being lower than said top surface whereby a strip of material is slidable on said top surface into a desired position without engaging said tool, a hopper surrounding the lower part of said tool and disposed beneath said opening for catching the waste material from said table falling through said opening, and a pipe leading from said hopper for discharging the waste material therefrom.

4. The structure according to claim 2 including visor and handguard means fixedly attached to said table and extending over said slot and said tool for protecting an operator of said machine.

5. The structure according to claim 2 in which said resilient means comprises a substantially horizontally extending rod fixedly mounted from said frame, movable means movably mounted on said rod for movement thereon in a first direction and in the opposite direction, link means having an upper end and a lower end and including a yoke adjacent the lower end thereof, said link means being pivotally connected adjacent the upper end thereof to said table, said yoke being pivotally connected to said movable means adjacent the transverse horizontal axis thereof so that the transmission of pressure from said link means to said movable means is balanced, bumper means for limiting movement of said movable means in opposite directions, a substantially cylindrical spring guide mounted on said rod adjacent one end thereof, a spring having one end thereof disposed over said spring guide and having the opposite end thereof engaging said movable means to urge said movable means towards said first direction and to carry said table towards said upper position, said spring guide being greater in diameter than said rod so that said spring is held away from said rod to prevent the scoring thereof, said movable means including a non-friction ball bushing engaging said rod and including a pair of wiper means adjacent opposite ends of said bushings in surrounding relationship to said rod for the cleaning thereof upon movement of said movable means on said rod.

6. The structure according to claim 2 in which said resilient means comprises a substantially horizontally extending rod fixedly mounted from said frame, movable means movably mounted on said rod for movement thereon in a first direction and in the opposite direction, means interconnecting said movable means and said table with said interconnecting means being pivotally connected to said movable means adjacent the transverse horizontal axis thereof so that the transmission of pressure from said table to said movable means is balanced, spring means engaging said movable means for urging said movable means towards said first direction to carry said table towards said upper position, said movable means including a pair of wiper means in surrounding relationship to said rod for the cleaning thereof upon movement of said movable means on said rod.

7. In a machine for working on strips of material, a substantially circular tool, means coupled to said tool for the rotational drive thereof, a yieldably and pivotally mounted work table, cleat bar means on said work table for engagement by the strip of material, said work table being pivotable between an upper position in which the strip of material is free of said tool and a lower position in which the strip of material is adapted to be carried into contact with said tool, said tool being positioned below and intermediate the ends of said cleat bar means when said table is in said upper position and said tool being adjacent said cleat bar means when said table is in said lower position, resilient means coupled to said table urging said table towards said upper position, said work table and said cleat bar means being arranged so that with said cleat bar means being engaged by a work piece downward pressure on said table and the work piece is effective to carry the work piece into contact with said tool and is effective to hold said strip of material in a fixed position while being worked on by said tool.

8. In a machine for working on strips of material each constituting a workpiece, a substantially circular tool, means coupled to said tool for the rotational drive thereof, a yieldably and pivotally mounted work table, cleat bar means on said work table for engagement by the strip of material, said work table being pivotable between an upper position in which the strip of material is free of said tool and a lower position in which the strip of material is adapted to be carried into contact with said tool, a fixed rod, movable means movably mounted on said rod for movement thereon in a first direction and in the opposite direction, means interconnecting said movable means and said table, spring means engaging said movable means for urging said movable means towards said first direction to carry said table towards said upper position, said work table and said cleat bar means being arranged so that with said cleat bar means being engaged by a work piece downward pressure on said table and the work piece is effective to carry the work piece into contact with said tool and is effective to hold said strip of material in a fixed position while being worked on by said tool.

References Cited in the file of this patent

UNITED STATES PATENTS

| | | |
|---|---|---|
| 322,396 | Rodgers | July 14, 1885 |
| 922,840 | Bemiller | May 25, 1909 |
| 1,397,606 | Smith | Nov. 22, 1921 |
| 1,450,459 | Smith | Apr. 3, 1923 |
| 1,584,028 | Gottschalk | May 11, 1926 |
| 1,585,818 | Barber | May 25, 1926 |
| 1,963,891 | Diver | June 19, 1934 |

FOREIGN PATENTS

| | | |
|---|---|---|
| 2,767 of 1926 | Australia | July 13, 1926 |
| 130,301 | Australia | Nov. 26, 1948 |
| 169,488 | Austria | Nov. 26, 1951 |
| 50,851 | Norway | May 18, 1932 |